US008247926B2

(12) United States Patent
Issa et al.

(10) Patent No.: US 8,247,926 B2
(45) Date of Patent: *Aug. 21, 2012

(54) METHODS AND SYSTEMS FOR WIRELESS ENERGY AND DATA TRANSMISSION

(75) Inventors: Anthony Francis Issa, Orlando, FL (US); Jeffrey Messer, San Bernadino, CA (US); John Michael Tobias, Toms River, NJ (US)

(73) Assignee: Extremely Ingenious Engineering, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,966

(22) Filed: Mar. 10, 2011

(65) Prior Publication Data

US 2011/0165837 A1    Jul. 7, 2011

Related U.S. Application Data

(63) Continuation of application No. 12/288,586, filed on Oct. 21, 2008.

(60) Provisional application No. 61/004,373, filed on Nov. 27, 2007.

(51) Int. Cl.
*H01F 38/00* (2006.01)
*H01F 5/02* (2006.01)
*H01F 5/04* (2006.01)

(52) U.S. Cl. ........................................................ 307/104
(58) Field of Classification Search ................... 307/104
See application file for complete search history.

(56) References Cited

U.S. PATENT DOCUMENTS

| 6,265,788 | B1 * | 7/2001 | Davidson et al. | 307/11 |
| 6,700,806 | B2 * | 3/2004 | Kolar | 363/89 |
| 7,514,818 | B2 * | 4/2009 | Abe et al. | 307/104 |
| 7,675,197 | B2 * | 3/2010 | Tetlow | 307/104 |
| 7,843,709 | B2 * | 11/2010 | Umeda et al. | 363/44 |

* cited by examiner

*Primary Examiner* — Hal Kaplan
(74) *Attorney, Agent, or Firm* — Milbank Tweed Hadley & McCloy LLP

(57) ABSTRACT

System and methods for wireless energy and data transmission are described. One aspect includes an emitter and receiver. The emitter may include primary and secondary emitting windings. The receiver may include primary and secondary receiver windings. In further aspects, the emitter may include a tertiary emitting winding and the receiver may include a tertiary receiver winding. In one aspect, the emitter uses driving circuitry and the receiver uses rectifying circuitry and one or more capacitors. In further aspects, the emitter and receiver are reversible.

14 Claims, 16 Drawing Sheets

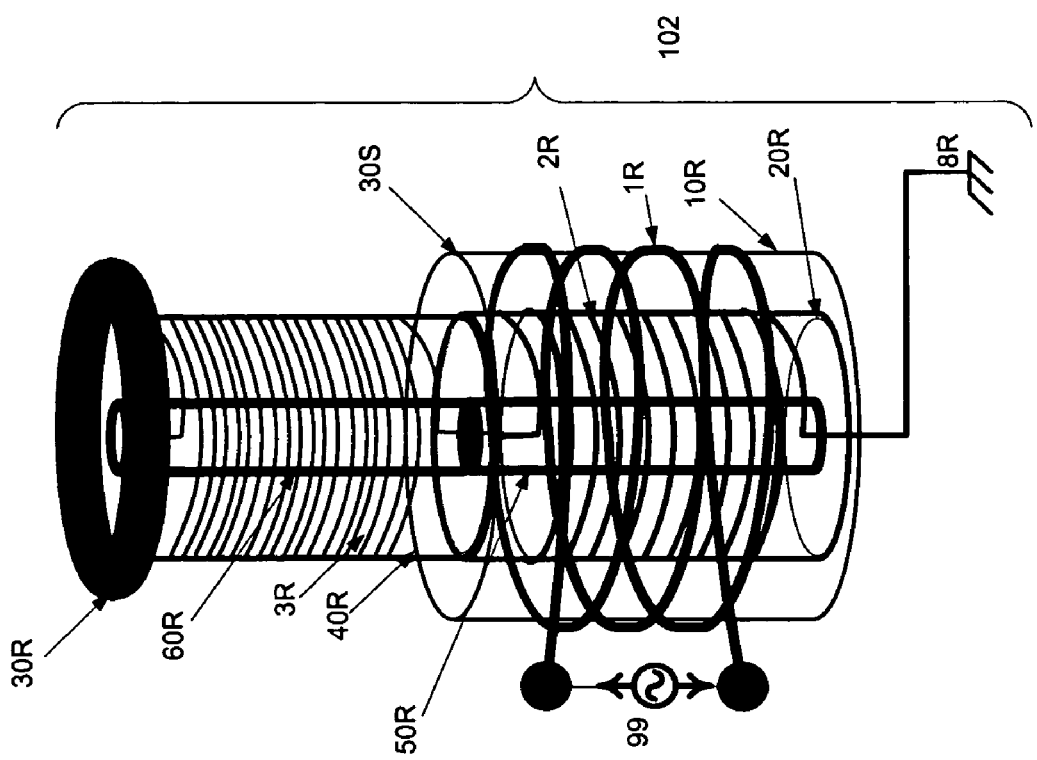

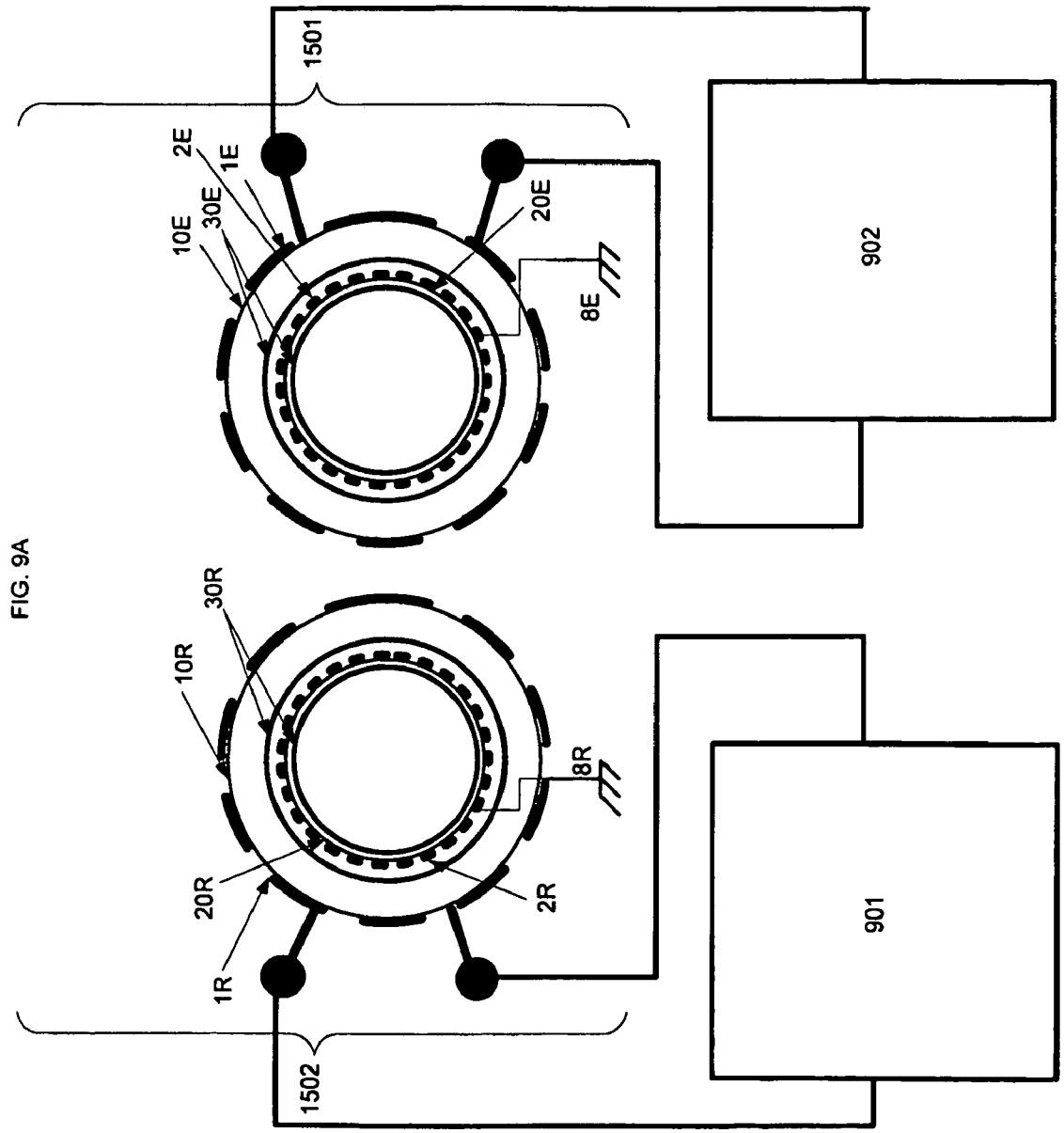

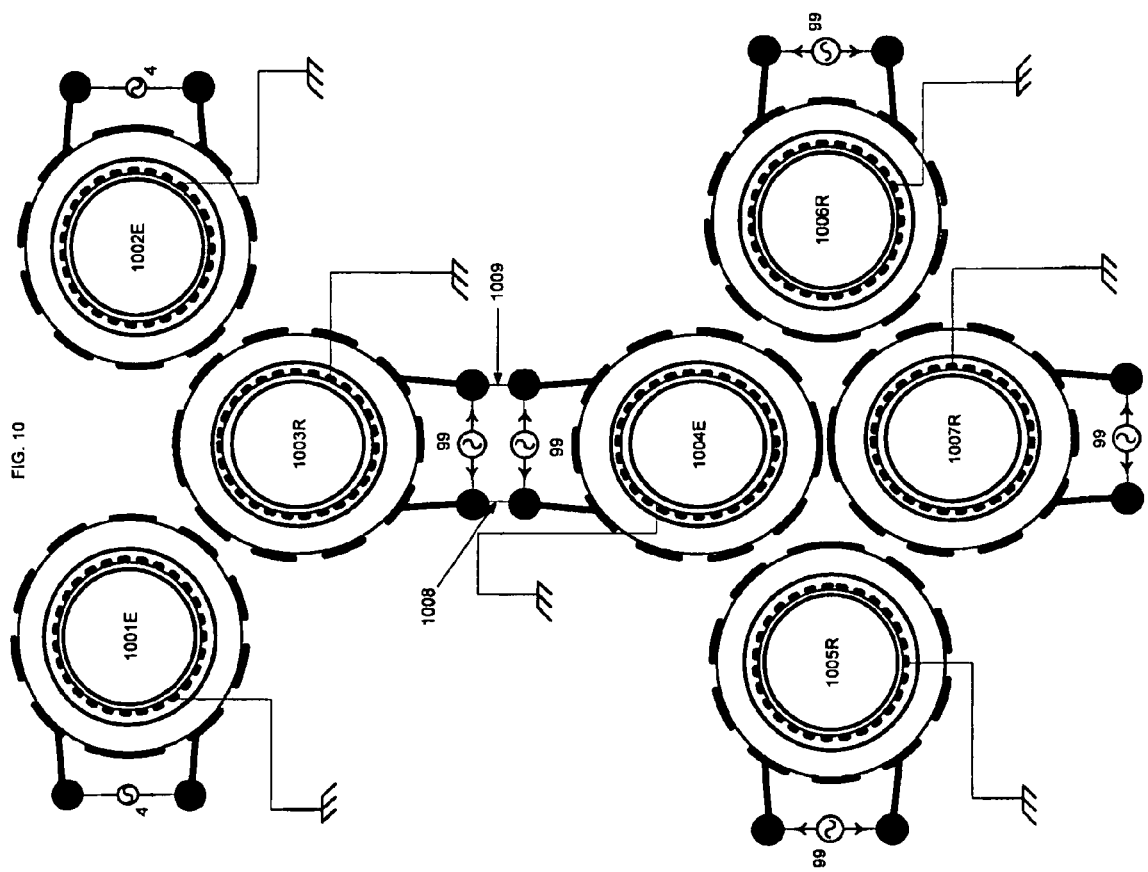

US 8,247,926 B2

METHODS AND SYSTEMS FOR WIRELESS ENERGY AND DATA TRANSMISSION

This application is a continuation of co-pending U.S. patent application Ser. No. 12/288,586 filed Oct. 21, 2008, entitled "Method and Systems for Wireless Energy and Data Transmission", which claims the benefit of provisional patent application Ser. No. 61/004,373, filed Nov. 27, 2007. This application hereby incorporates by reference the entire contents of each of U.S. non-provisional patent application Ser. No. 12/152,545 titled "System and Method for Forming and Controlling Electric Arcs," filed May 15, 2008; U.S. non-provisional patent application Ser. No. 12/152,525 titled "System and Method for Controlling an Electromagnetic Field Generator," filed May 15, 2008; and U.S. non-provisional patent application Ser. No. 12/214,655 titled "System and Method for Using a Vacuum Core High Temperature Superconducting Resonator," filed Jun. 20, 2008.

FIELD OF THE INVENTION

The present invention relates to methods and systems for wireless energy and data transmission.

BACKGROUND OF THE INVENTION

It may be desirable to have a system and method for wireless energy and data transmission, especially in fields including, but not limited to, manufacturing, robotics, and consumer devices. By powering devices through wireless transmission of energy, the requirement for batteries or other chemical energy storage means may be reduced. In turn this may reduce the need for copper or aluminum cabling manufacturing costs and battery waste, thereby resulting in more environmentally friendly products.

The use of wireless transmission of energy may also simplify installation, as said devices may be moved without labor intensive rewiring. An additional benefit may be gained from the simultaneous transmission of data over the same carrier wave that transmits the energy for similar reasons of utility, device simplicity, and cost reduction through the use of fewer discrete devices in a given device design. Such use may also conserve bandwidth in other wireless pure data transmission regimes, which may lead to increased network efficiencies.

SUMMARY OF THE INVENTION

In certain aspects, the present invention may provide a system for wirelessly transmitting and receiving energy. In one aspect, the system may include an emitter and a receiver. The emitter may include a primary emitting winding wrapped around a first support and having first and second ends coupled to a driver and a secondary emitting winding wrapped around a second support and having a first end of the secondary emitting winding coupled to a first top load and a second end. The receiver may include a primary receiving winding wrapped around a third support and having first and second ends coupled to first and second inputs of a rectifying circuitry, respectively. The first output of the rectifying circuitry may be coupled to a first terminal of one or more capacitors and a second output of the rectifying circuitry may be coupled a second terminal of the one or more capacitors. The receiver may further include a secondary receiving winding wrapped around a fourth support and having a first end coupled to a second top load and a second end.

In one aspect, the second support may be located within the first support and the fourth support may be located within the third support. In another aspect, the first support may be located with the second support and the third support may be located within the fourth support.

In one aspect, the emitter may include a primary emitting winding wrapped around a first support and having first and second ends coupled to a driver, a secondary emitting winding wrapped around a second support and having first and second ends, and a tertiary emitting winding wrapped around a third support and having a first end of the tertiary emitting winding coupled to the first end of the secondary emitting winding and the second end of the tertiary emitting winding coupled to a first top load. In one aspect, the receiver may include a primary receiving winding wrapped around a fourth support and having first and second ends coupled to first and second inputs of a rectifying circuitry, respectively, where a first output of the rectifying circuitry is coupled to a first terminal of one or more capacitors and a second output of the rectifying circuitry is coupled to a second terminal of the one or more capacitors. The receiver may further include a secondary receiving winding wrapped around a fifth support and having first and second ends and a tertiary receiving winding wrapped around a sixth support and having a first end of the tertiary receiving winding coupled to the first end of the secondary receiving winding and the second end of the tertiary receiving winding coupled to a second top load.

In further aspects, the first support may be located within the second support, the fourth support may be located within the fifth support, the third support may be located above the first and second supports, and the sixth support may be located above the fourth and fifth supports.

In another aspect, the second support may be located with the first support, the fifth support may be located within the fourth support, the third support may be located above the first and second supports, and the sixth support may be located above the fourth and fifth supports.

In one aspect, the present invention may provide for a method of wirelessly transferring data and energy. The method may include inputting a data signal, inputting power to a driver, generating a carrier wave with the driver at a resonant frequency of an emitter, modulating the carrier wave based on the data signal to create a combined signal, driving the combined signal to an AC input on the emitter, electromagnetically coupling the emitter to a receiver, reproducing the combined signal in an AC output of the receiver, rectifying the AC output into DC power, demodulating the combined signal into the data signal, and transmitting the data signal to a device.

In one aspect, the present invention may provide for a method of wirelessly transmitting and receiving energy. The method may include transmitting an alternating current into a driver coupled to a primary emitting winding of an emitter, inducing the alternating current into a secondary emitting winding of the emitter, sensing a frequency of the alternating current on the secondary emitting winding, transmitting a feedback signal to the driver based on the frequency, driving the AC current into the primary emitting winding at the resonant frequency of the secondary emitting winding, electromagnetically coupling the emitter to a receiver, inducing the alternating current into a secondary receiving winding of the receiver, inducing the alternating current into a primary receiving winding of the receiver, outputting the alternating current into a rectifying circuitry, rectifying the alternating current into a direct current; reducing ripples on the direct current, and transmitting the direct current to a device.

BRIEF DESCRIPTION OF THE DRAWINGS

Features and other aspects of embodiments of the present invention are explained in the following description taken in conjunction with the accompanying drawings, wherein:

FIG. 1E illustrates a receiver including materials of high magnetic permeability according to one aspect of the system and method of the present disclosure;

FIG. 9A illustrates a reversible Tesla coil system where the function of emitter and receiver may alternate according to one aspect of the system and method of the present disclosure;

FIG. 10 illustrates a representative example of a network of Tesla coil emitters and receivers according to one aspect of the system and method of the present disclosure;

The drawings are exemplary, not limiting. It is intended for items that are labeled with the same number in multiple figures to refer to the same item throughout the figures.

DETAILED DESCRIPTION

Various embodiments of the present invention will now be described in greater detail with reference to the drawings.

Figure 1A:
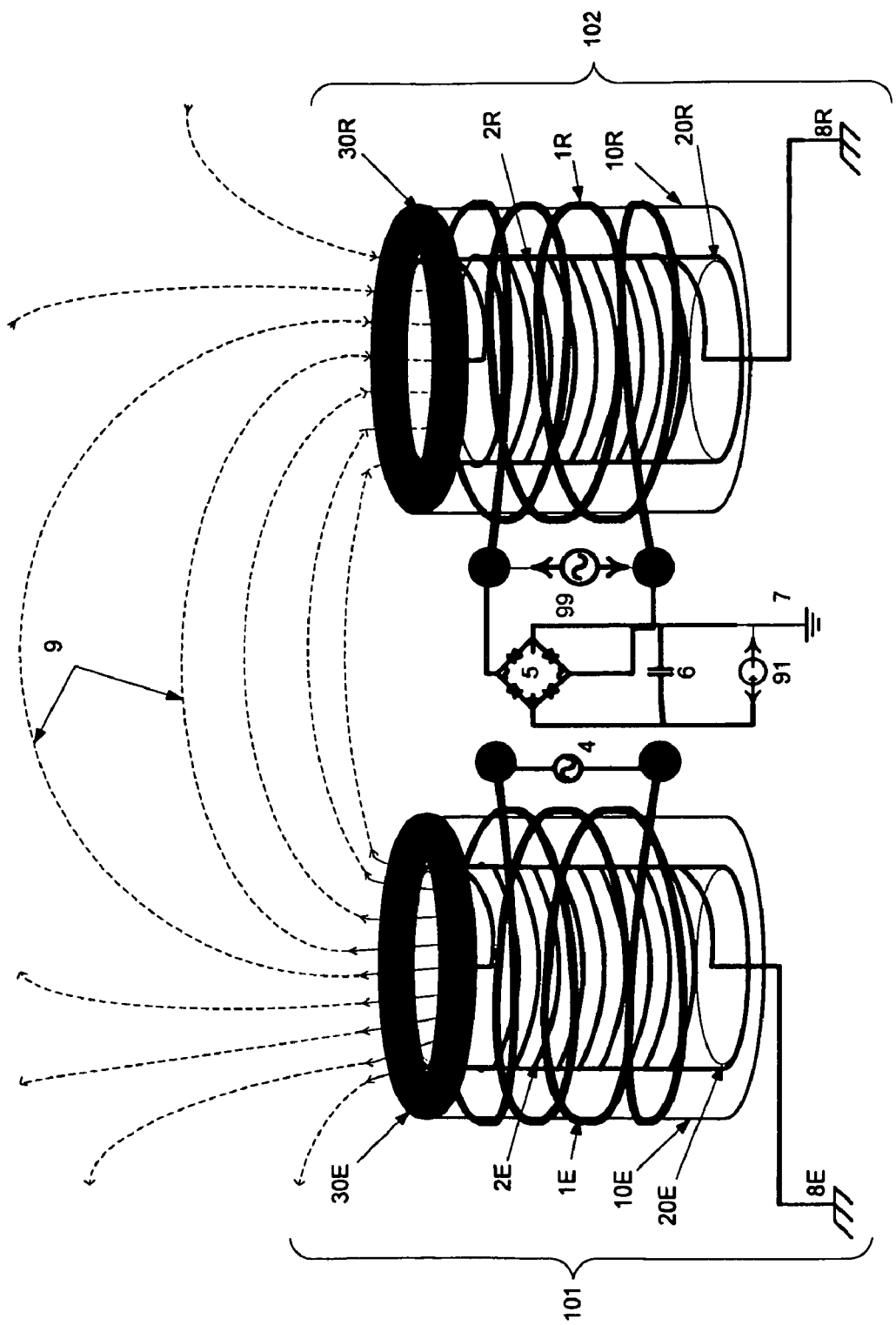
FIG. 1A illustrates a general system including a Tesla coil emitter and receiver according to one aspect of the system and method of the present disclosure.

As shown in FIG. 1A, one aspect may include two Tesla resonators 101 and 102, which may be electromagnetically coupled through emitting a time-varying magnetic and/or electric field 9. Tesla resonators 101 and 102 may be oriented parallel to each other. The emitting Tesla resonator apparatus ("emitter") 101 may emit the field, while the receiving Tesla coil apparatus ("receiver") 102 may subtend the magnetic field from the emitter 101. Parallel orientation of emitter 101 and receiver 102 may ensure maximum flux coupling between them. Emitter 101 may include primary winding 1E, secondary winding 2E, support apparatus for primary winding 10E, and support apparatus for secondary winding 20E; receiver 102 may include primary winding 1R, secondary winding 2R, support apparatus for primary winding 10R, and support apparatus for secondary winding 20R. Primary and secondary windings 1E, 1R, 2E, and 2R may be composed of any common wiring material used in the implementation or construction of coils and transformers. Other aspects may use other materials. Primary structural supports 10E and 10R and secondary structural supports 20E and 20R may be composed of ceramic, plastic, Plexiglas®, or any other insulating or nonconductive (e.g., dielectric) material. Primary winding 1E and 1R may be wrapped around primary structural supports 10E and 10R, respectively, and secondary windings 2E and 2R may be wrapped around secondary structural supports 20E and 20R, respectively. Windings 1E, 1R, 2E, and 2R may be wrapped in a helically-coiled fashion, where each primary winding 1E and 1R is oriented similarly as its respective secondary winding 2E and 2R. In such aspects, the ends of each winding may not be helically-coiled, as, in various aspects, they may be coupled to other windings, circuitry, or to ground. Primary and secondary structural supports 10E, 10R, 20E, and 20R may be cylindrical in shape. With respect to structural supports and windings, emitter 101 may be substantially identical to, or identically arranged as, receiver 102.

In one aspect, primary windings 1E and 1R may be 6 AWG wire; secondary windings 2E and 2R may be 24 AWG wire; and tertiary windings 3E and 3R may be 28 AWG wire. In another aspect, secondary windings 2E and 2R may have 1,800 turns; tertiary windings 3E and 3R may have 2,400 turns; primary receiver winding 1R may have 12 turns; and primary emitter winding 1E may have 28 turns. In other aspects, other wires and different numbers of turns may be used. The drawings of the windings in the figures are not intended to show the exact number of turns or ratio of turns used in aspects of the present invention. In one aspect, primary structural supports 10E and 10R may be about 12 inches each in diameter; secondary structural supports 20E and 20R may be about 8 inches each in diameter; and tertiary structural supports 40E and 40R may be each about 6 inches in diameter. In one aspect, top loads 30E and 30R may be each about 2.5 inches thick, about 8 inches in outer diameter, and about 6 inches in inner diameter. In one aspect having primary windings 1E and 1R located within secondary windings 2E and 2R, respectively (as shown in FIG. 1D according to one aspect), primary structural supports 10E and 10R may have a smaller diameter than secondary structural supports 20E and 20R, for example, 6 inches in outer diameter. In one aspect having tertiary windings 3E and 3R, an end cap made of a nonconductive material may be used on the larger of the primary and secondary structural supports 10E, 10R, 20E, and 20R in order to provide a base for tertiary structural supports 40E and 40R. In other aspects, other sized supports and top loads may be used.

In one aspect, top loads 30E and/or 30R may be provided on the secondary windings 2E and/or 2R that may reduce eddy currents and corona and thereby may reduce electric leakage of the device through corona. Secondary top loads 30E and 30R may be comprised of a toroidal metal shape with a hole cut out of the center of the toroid that is penetrated by the inner diameter of secondary supports 20E and/or 20R of secondary windings 2E and/or 2R. In these aspects, the final coil in the series (whether secondary or tertiary) may receive top loads 30E and/or 30R. Using top loads 30E and/or 30R may reduce energy loss by about 5-10% by reducing eddy currents. In another aspect, toroidal top loads 30E and/or 30R may also use a vertical slit as opposed to the circular hole for similar purposes and effects.

As shown in FIG. 1D, one aspect may include primary windings 1E and 1R wrapped around primary structural supports 10E and 10R, respectively, and have primary structural supports 10E and 10R located within secondary structural supports 20E and 20R, respectively. In further aspects, one or more tertiary windings 3E and 3R may be wrapped around tertiary structural supports 40E and 40R, respectively, which sit on top of primary and secondary structural supports 10E, 20E, 10R, and 20R. In further aspects, tertiary emitting winding 3E having two ends wrapped around tertiary support structure 40E may be coupled to the end of secondary emitting winding 2E that is not connected to ground. The other end of the tertiary emitting winding 3E may be connected to top load 30E (or, in other aspects, to another emitting winding in the same pattern (not shown)). In further aspects, tertiary emitting winding 3E may have more windings than secondary emitting winding 2R in order to create more voltage if more voltage is desired.

In further aspects, tertiary receiving winding 3R having two ends wrapped around tertiary support structure 40R may be connected to the end of secondary receiving winding 2R that is not connected to ground. The other end of tertiary receiving winding 3R may be connected to top load 30R (or, in other aspects, to another emitting winding in the same pattern (not shown)). In further aspects, tertiary receiving winding 3R may have more windings than secondary receiving winding 2R in order to create more voltage if more voltage is desired.

In further aspects, the system may include one or more tertiary Tesla resonators (not shown) or emitters (not shown). In further aspects, additional windings may be used; therefore, aspects are not intended to be limited to merely two or three windings.

In further aspects, AC voltage 4 may be presented through application of a solid state driving system that drives primary emitting winding 1E at the resonant frequency of Tesla resonators 101 and 102. Receiver 102 may receive energy through electromagnetic coupling to emitter 101.

In further aspects, the coil structure of emitter 101 and receiver 102 may be substantially identical, with one difference being the driving circuitry of emitter 101 and the rectification circuitry of receiver 102. In further aspects, emitter 101 and receiver 102 may be provided with the rectification and switching circuits along with circuitry to switch between the two, so that energy may be transferred back and forth between emitter 101 and receiver 102. In further aspects, an electromagnetic field couples emitter 101 to receiver 102. Current from primary winding emitter 1E ultimately may couple through the exchange of electromagnetic energy into receiver 102. That is, primary emitting winding 1E may induce AC voltage 99 on primary receiving winding 1R through electromagnetic coupling between emitter 101 and receiver 102. AC out 99 may be rectified by full bridge rectifier 5 and may charge capacitor 6 with DC out 91 voltage.

In aspects, emitter 101 and receiver 102 may be spatially distributed, either in fixed positions or mobile. These fixed positions may not be in set locations, so long as receiver 102 is within a certain range of emitter 101 that may be determined by the electromagnetic field intensity of a particular device. Likewise, a mobile receiver 102 may not be required to be constrained to a track or fixed path but so long as it remains within a certain range of one or more emitters 101. In further aspects, multiple emitters 101 and receivers 102 may be used, where several receivers 102 may draw energy from one emitter 101 or a single receiver 102 may draw energy from multiple emitters 101 (and so forth).

Figure 1B:
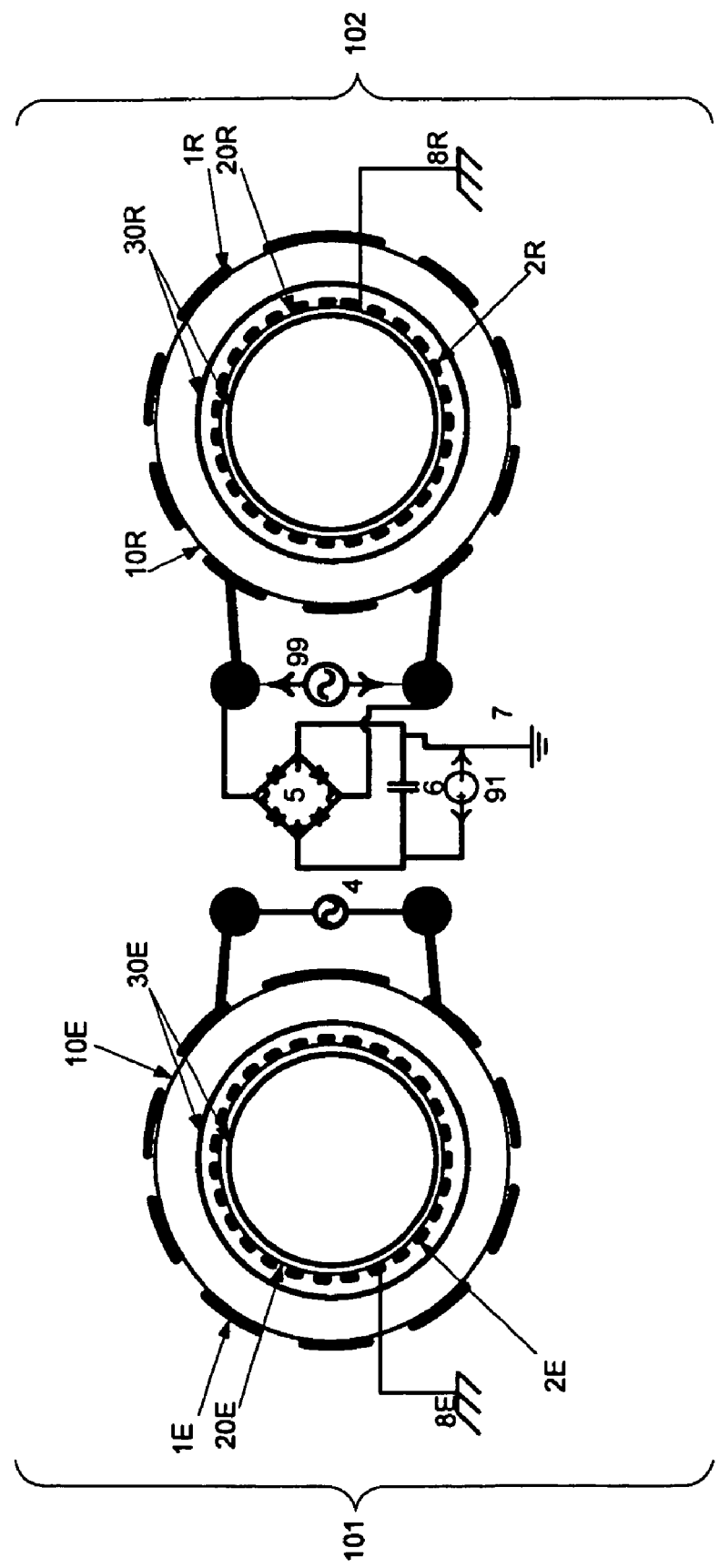
FIG. 1B illustrates a general system including a Tesla coil emitter and receiver in plan view according to one aspect of the system and method of the present disclosure.

FIG. 1B displays emitter 101 and receiver 102 in plan view according to one aspect of the system of the present disclosure.

Figure 1C:
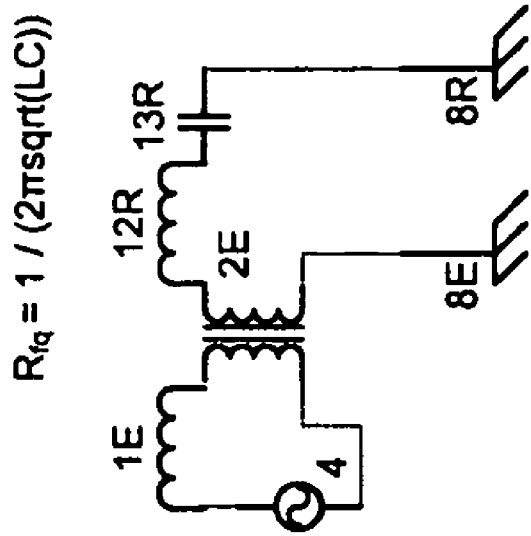
FIG. 1C illustrates a schematic representation of a Tesla coil emitter and receiver according to one aspect of the system and method of the present disclosure.
Figure 1D:
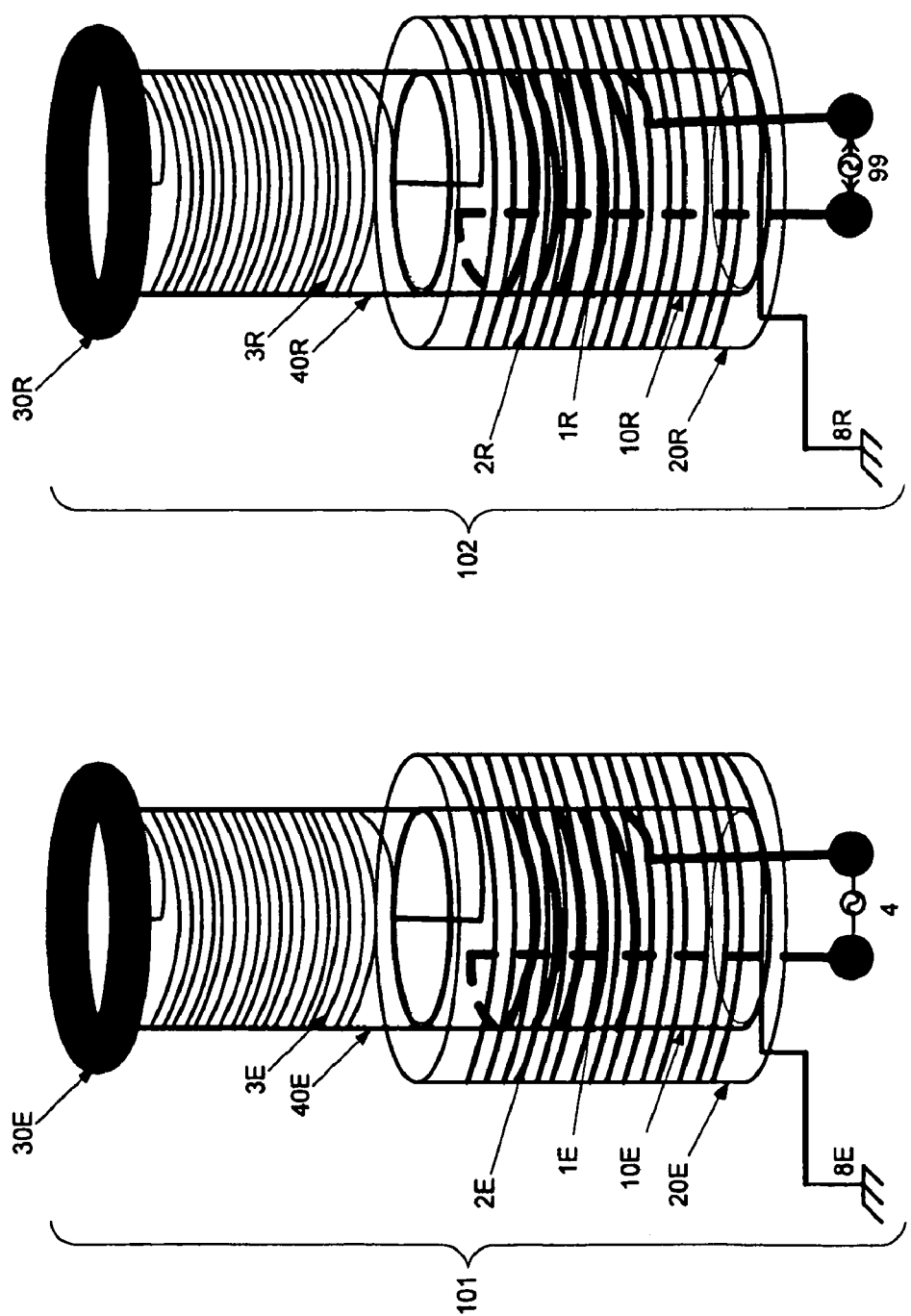
FIG. 1D illustrates a general system including Tesla coil emitter and receiver each with tertiary windings and the primary windings located within the secondary windings according to one aspect of the system and method of the present disclosure.

FIG. 1C shows an electrical schematic according to one aspect The resonant frequency is given by equation $Fr=1/(2\pi \sqrt{LC})$, where C is capacitive value of 13R and L is inductive value of lumped inductance 12R of secondary emitting winding 2E.

As shown in FIG. 1C, further aspects may include secondary emitting winding 2E and loading capacitor 13R, which may be attached to ground 8E and 8R. In further aspects, secondary emitting winding 2E may be floating, that is, not connected to electrical ground. In further aspects, loading capacitor 13R may be floating.

As shown in FIG. 1E, one aspect may include cylinders of high permeability material (e.g., iron, Mu metal, HyMu80) 50R and 60R in structural supports 30S and 40R, respectively. Use of cylinders of high permeability material 50R and 60R in receiver 102 may make the power transfer more efficient between emitter 101 and receiver 102 by concentrating the magnetic flux within the windings surrounding the cylinders of high permeability material 50R and 60R. In one aspect, cylinders of high permeability material 50R and 60R may be solid. In another aspect, cylinders of high permeability material 50R and 60R may be hollow, such as, a sheet of such material wrapped into a cylindrical form. In other aspects, high permeability material 50R and 60R may be a form in shapes other than a cylinder.

Figure 2:
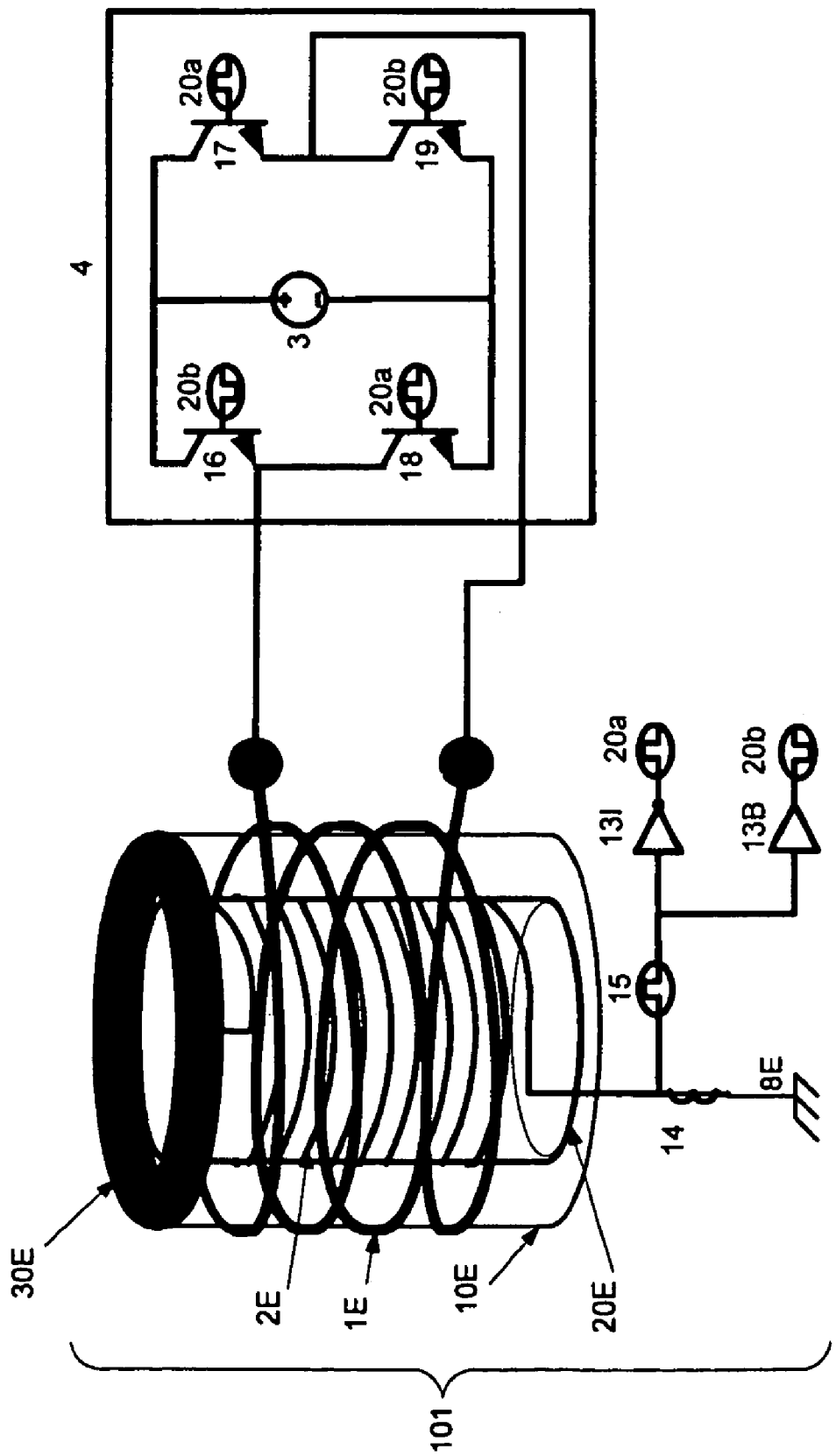
FIG. 2 illustrates a driving circuit detail according to one aspect of the system and method of the present disclosure.

FIG. 2 shows the driving circuit of emitter 101 according to one aspect of the system of the present disclosure. Primary emitting winding 1E may be driven by insulated gate bipolar transistors ("IGBT"s) 16, 17, 18, and 19 in an H-bridge configuration with a power source 3. The AC signal to primary emitting winding 1E may thereby induce a voltage in secondary winding 2E, initiating the Tesla coil effect.

Further aspects may include a feedback system that monitors the direction of current via current drive transformer 14. In one aspect, current drive transformer 14 is coupled to secondary emitting winding 20E. Current drive transformer 14 may sense current on secondary emitting winding 20E, where current drive transformer 14 may provide voltage in response to oscillation at the resonant frequency of secondary emitting winding 20E. Digital feedback signal 15 may be a logic "1" signifying current flowing in one direction and a logic "0" signifying current flowing in the opposite direction. Feedback signal 15 may allow the H-bridge to determine when to switch its transistors such that induced current flows into emitter 101 from primary emitting winding 1E may constructively interfere to increase magnetic flux in emitter 101. In further aspects, the feedback system drives primary emitting winding 1E at the resonant frequency of secondary emitting winding 2E.

In further aspects, feedback signal 15, filtered with inverting 13I and non-inverting 13B IGBT gate drive system, may create logic signals 20a and 20b. Logic signals 20a and 20b may drive the H-bridge with the frequency, phase, and polarity for an alternating current to flow to primary emitter winding 1E to amplify the resonating field in emitter 101. Thus, the device may be self-correcting in phase and frequency.

Figure 3:
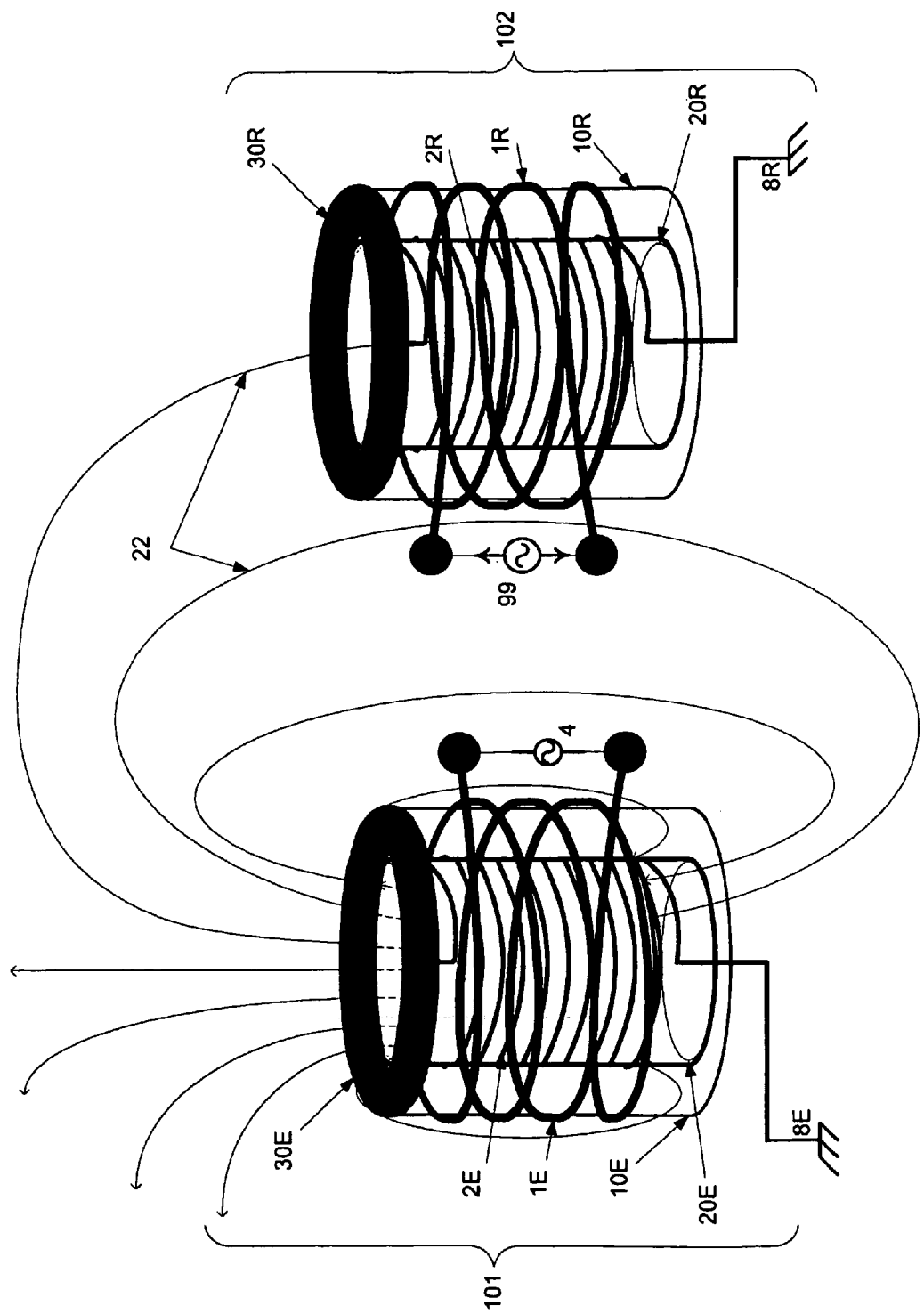
FIG. 3 illustrates a magnetic field coupling of the coils according to one aspect of the system and method of the present disclosure.

FIG. 3 shows a magnetic field coupling between emitter 101 and receiver 102 according to one aspect. Magnetic flux lines 22 are intended to be drawn to show that secondary receiving winding 2R of receiver 102 is immersed in field 22. In further aspects, AC voltage 99 may result from the magnetic field coupling and the effect of secondary receiving winding 2R and primary receiving winding 1R. Because of the physical properties of Tesla coils, when an exciting voltage is presented to 99, receiver 102 may be capable of acting as an emitter and transferring energy to emitter 101.

Figure 4:
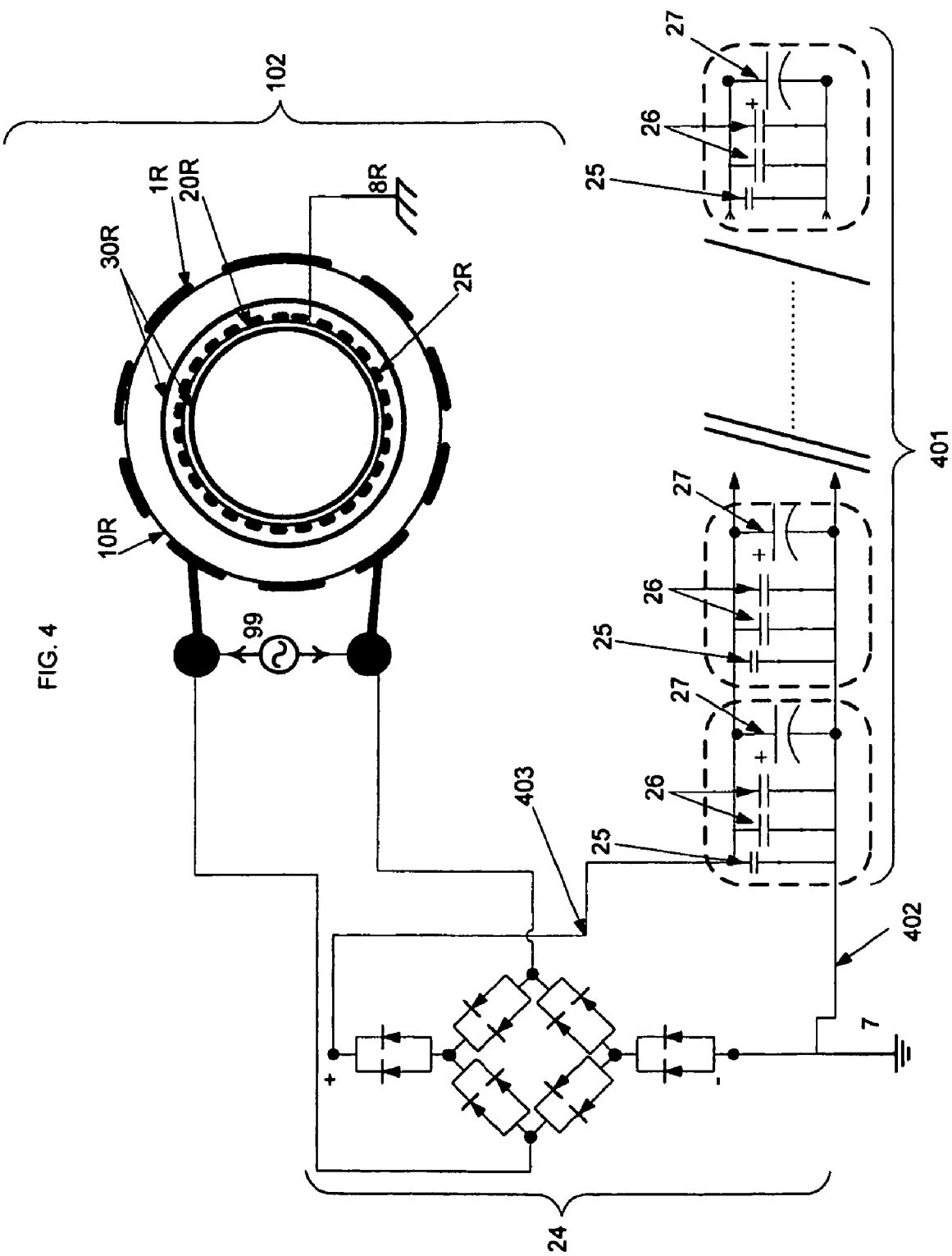
FIG. 4 illustrates a receiver rectification circuit detail with capacitor bank according to one aspect of the system and method of the present disclosure.

Wireless energy transfer may allow the conversion of the AC signal 99 from primary receiving winding 1R into a useful form. As shown in FIG. 4, according to one aspect of the system of the present disclosure, the conversion of AC voltage output 99 to DC voltage across capacitor 27 may occur from induced current in primary receiver winding 1R, which was demonstrated as induced by a coupled magnetic field between Tesla resonators 101 and 102. DC voltage exiting diode array 24 may be imperfect because of possible ripples. Output current 99 may be rectified via high recovery speed diodes and diode array 24 and stored into, for example, capacitor bank 401, as shown according to one aspect. In further aspects, high recovery speed diodes and diode array 24 may be rated at, for example, 1200V, 60 A with a reverse recovery time of 30 ns and a speed for fast recovery=<500 ns and =>200 mA. In one aspect, adding diodes (not shown) to diode array 24 may allow the system to handle higher voltages.

In further aspects, capacitor bank 401 may be a system of capacitors for the purpose of storing energy. The system may include low inductance polymeric capacitor 26 and snubber capacitor 25 acting as filters connected in parallel to electrolytic capacitor 27 acting as a storage capacitor for fast charging and discharging of capacitors 25, 26, and 27. Low internal and external stray inductance may be achieved by minimum length of wires interconnecting capacitors 25 and 26 and capacitor 27. Diode array 24 may be connected to inputs of capacitor bank 401 through leads 402 and 403 between the positive (+) and negative (−) outputs on diode array 24 and the positive (+) and negative (−) inputs on capacitor bank 401. In further aspects, minimizing and equalizing the inductance of leads 402 and 403 may be accomplished by ensuring leads 402 and 403 are of equal length, and as short as possible.

Figure 5:
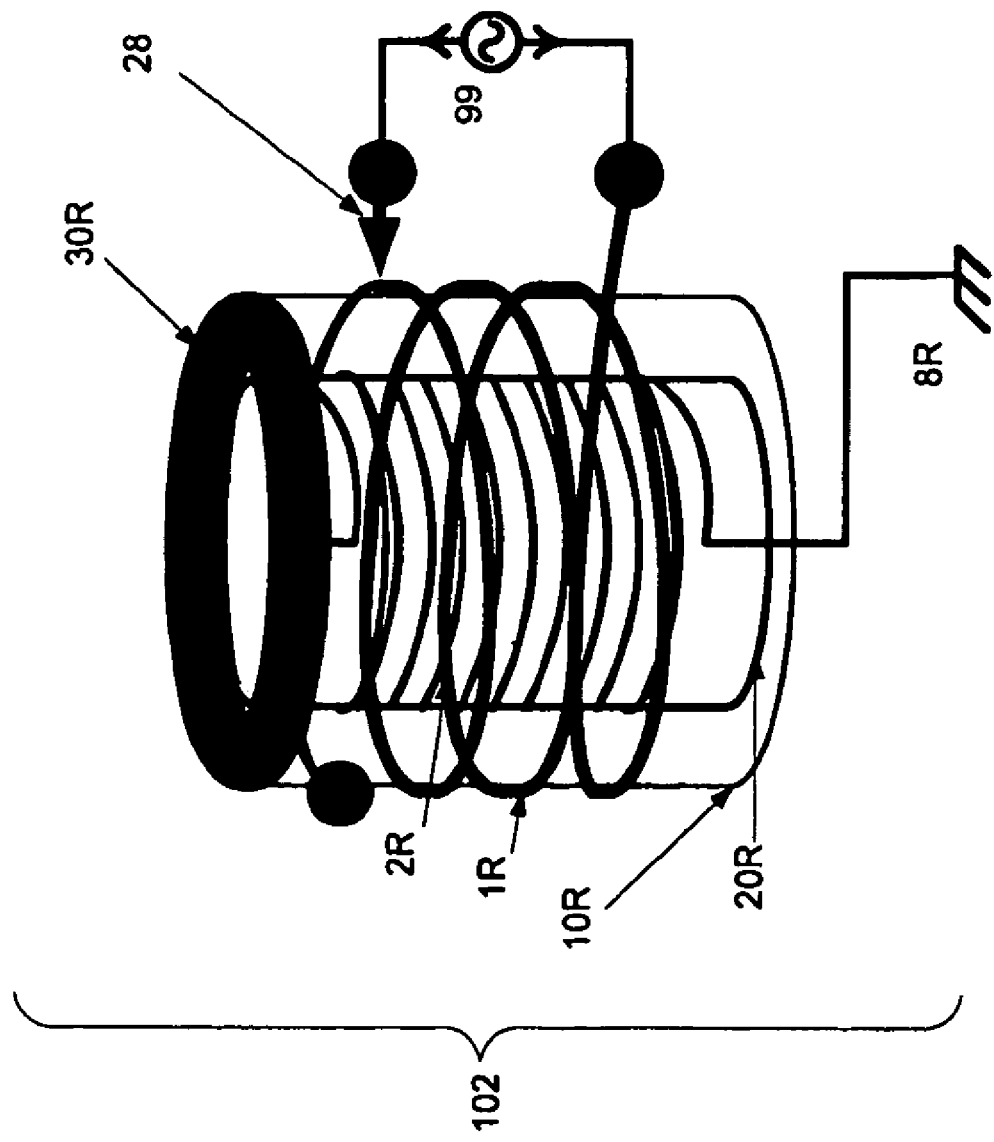
FIG. 5 illustrates a variable tap implemented on Tesla coil according to one aspect of the system and method of the present disclosure.

As shown in FIG. 5, further aspects may include variable tap 28 on primary receiving winding 1R of receiver 102. Variable tap 28 may be a moveable and changeable connection on a transformer through which the voltage may be changed. Variable tap 28 may change the voltage output to the voltage input ratio, similar to the ways an iron core transformer with multiple primary taps may change in voltage with relative voltage output to voltage input ratio change. Because in aspects, the system is reversible, variable tap 28 may be coupled to primary emitting winding 1E or emitter 101.

Figure 6:
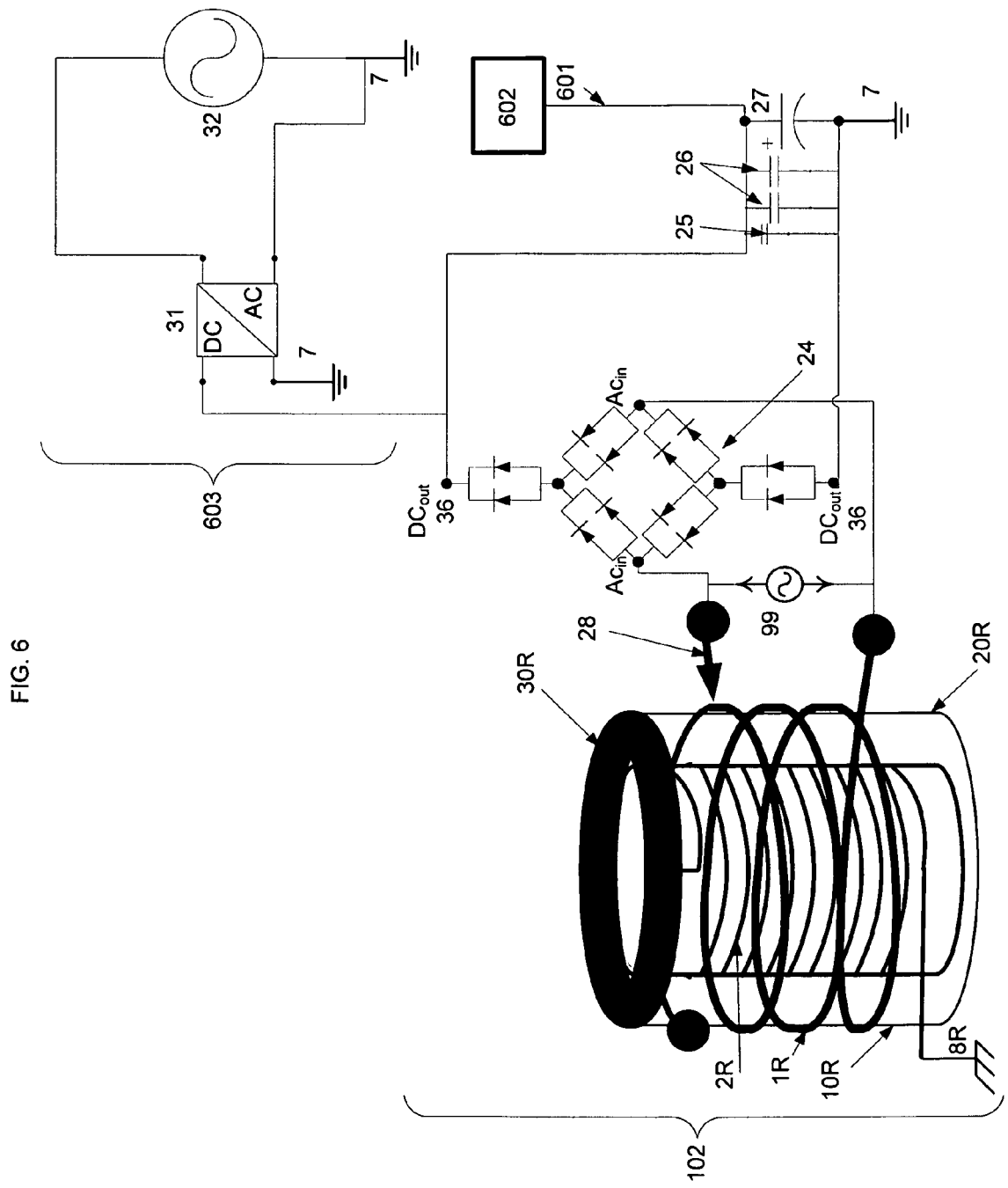
FIG. 6 illustrates an example of application of a system to provide power for utilization according to one aspect of the system and method of the present disclosure.

As shown in FIG. 6, further aspects may include receiver 102 with primary receiver winding 1R and variable pick-up tap 28. For example, if it is desired to have 12 VDC for a standard DC-to-AC (60 hz) inverter, primary receiver winding 1R may be tapped by variable tap 28, such that the RF output may be about ~10 Vrms, which yields about ~14 Vdc, so up to about 2 Vdc may be lost by forward diode drops over rectifying diodes 24. DC rectifying array 24 and capacitors 25, 26, and 27 may allow stable and constant DC power to inverter 31. In further aspects, this may be a particularly useful configuration due to the widespread use of 60 Hz 120 VAC for power applications. However, many different DC and AC outputs could be synthesized from the signal generated by primary receiving winding 1R. In one aspect, device 602 may receive DC power from the system by being connected to positive (+) output 27 through wire 601, and device 32 may receive AC power from DC inverter 31.

Figure 7:
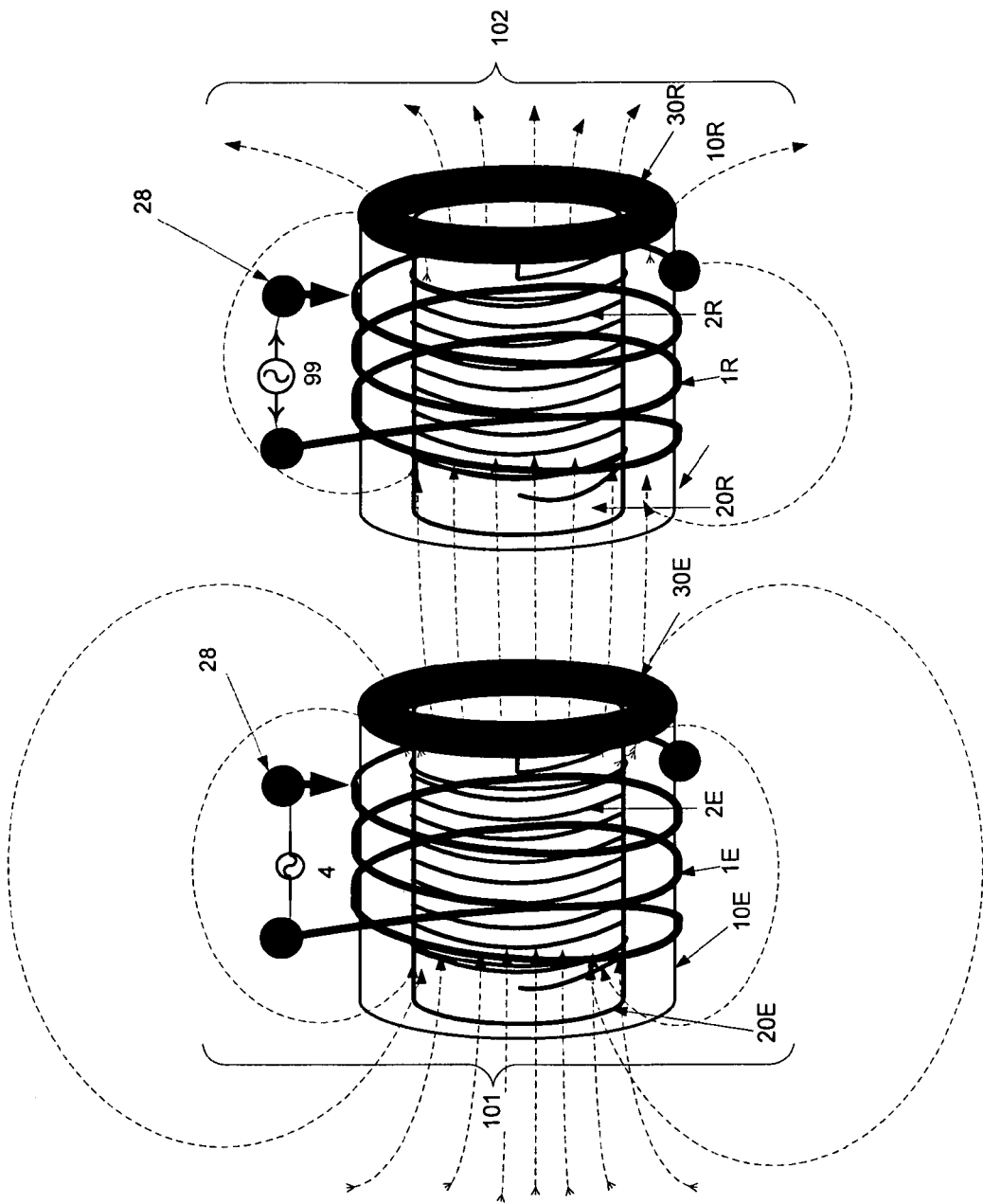
FIG. 7 illustrates a coaxial orientation of emitter and receiver according to one aspect of the system and method of the present disclosure.

As shown in FIG. 7 according to aspects, emitter 101 and receiver 102 may be oriented in a manner whereby the windings could remain parallel but share a common coil axis. Alternatively, in further aspects, the coils may be oriented in a similar configuration, for example, as shown in FIG. 1A, but without a common coil axis (not shown), for example, if two coils were placed on different floors of a building (like at the top-left corner of a second floor and bottom right corner of a first floor). In other aspects, emitter 101 and receiver 102 may be transposed such that top loads 30E and 30R are facing each other.

Figure 8:
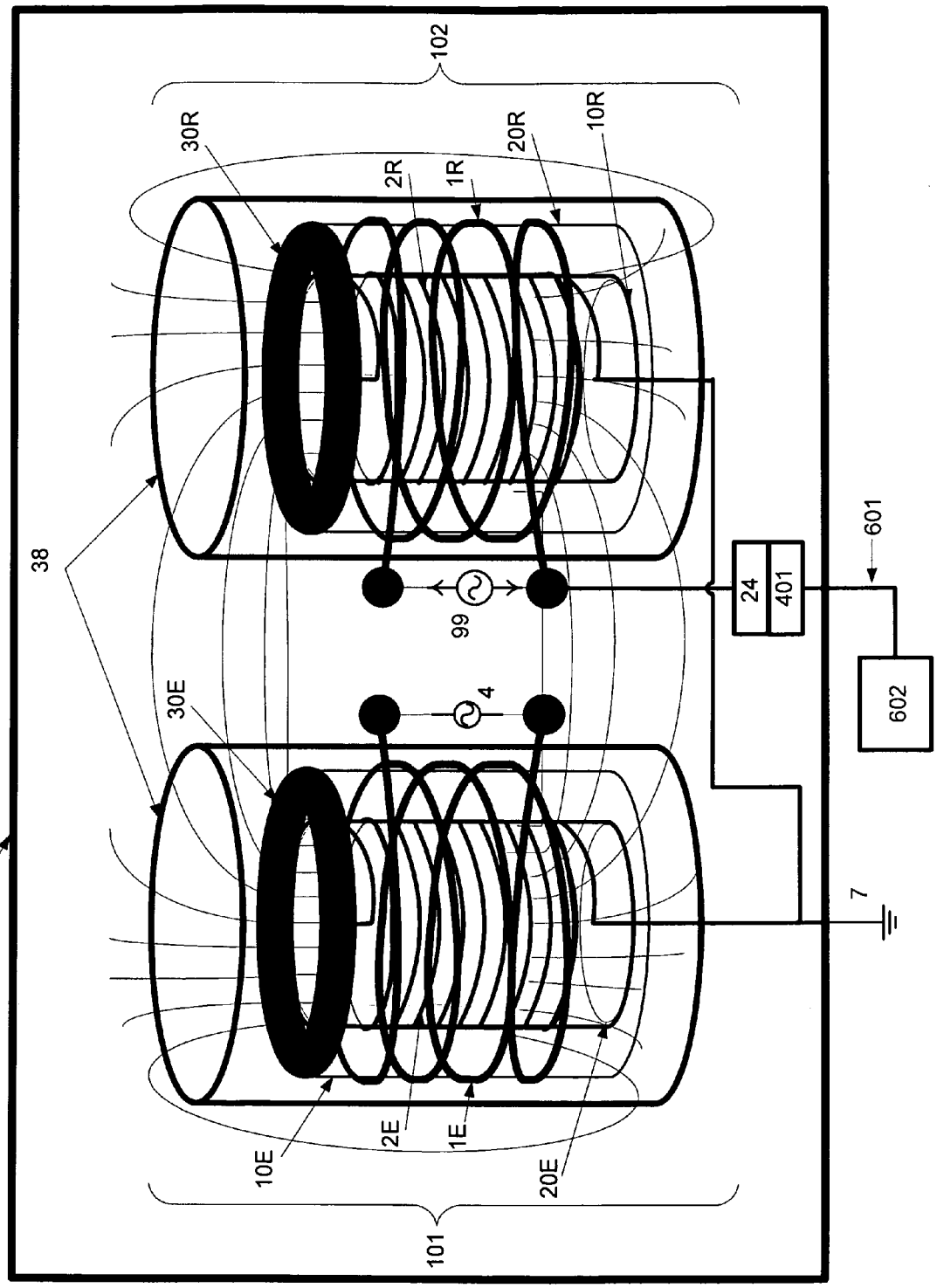
FIG. 8 illustrates a Tesla coil emitter and receiver according to one aspect of the system and method of the present disclosure.

As shown in FIG. 8 according to further aspects, because it is possible to achieve high voltages on secondary windings 2E and 2R, an arc suppression system may be implemented on emitter 101. FIG. 8 is illustrated to show such an aspect, given the cylinders labeled 38 surrounding windings 1R, 2R, 1E, and 2E are constructed as, for example, a gas tight enclosure. In another aspect, emitter 101 and/or receiver 102 may be immersed in an atmosphere of higher dielectric breakdown strength compared to air (for example, sulfur hexafluoride) to suppress corona and breakdown arcs. In one aspect, cylinders 38 may be vacuums.

In one aspect, emitter 101 and receiver 102 may be screened by a Faraday-cage type of enclosure 801 to reduce electric fields around the system. This aspect may operate as a transformer. Driving circuitry 4 may be inside or outside Faraday-cage type of enclosure 801, but the power supply to driving circuitry 4 is outside Faraday-cage type of enclosure 801. Wire 601 may transfer DC power to device 602 outside Faraday-cage type of enclosure 801. In one aspect, Faraday-cage type of enclosure 801 is connected to ground 7. In one aspect, secondary windings 2E and 2R are floating and, therefore, are not connected to grounds 8E and 8R.

Figure 9B:
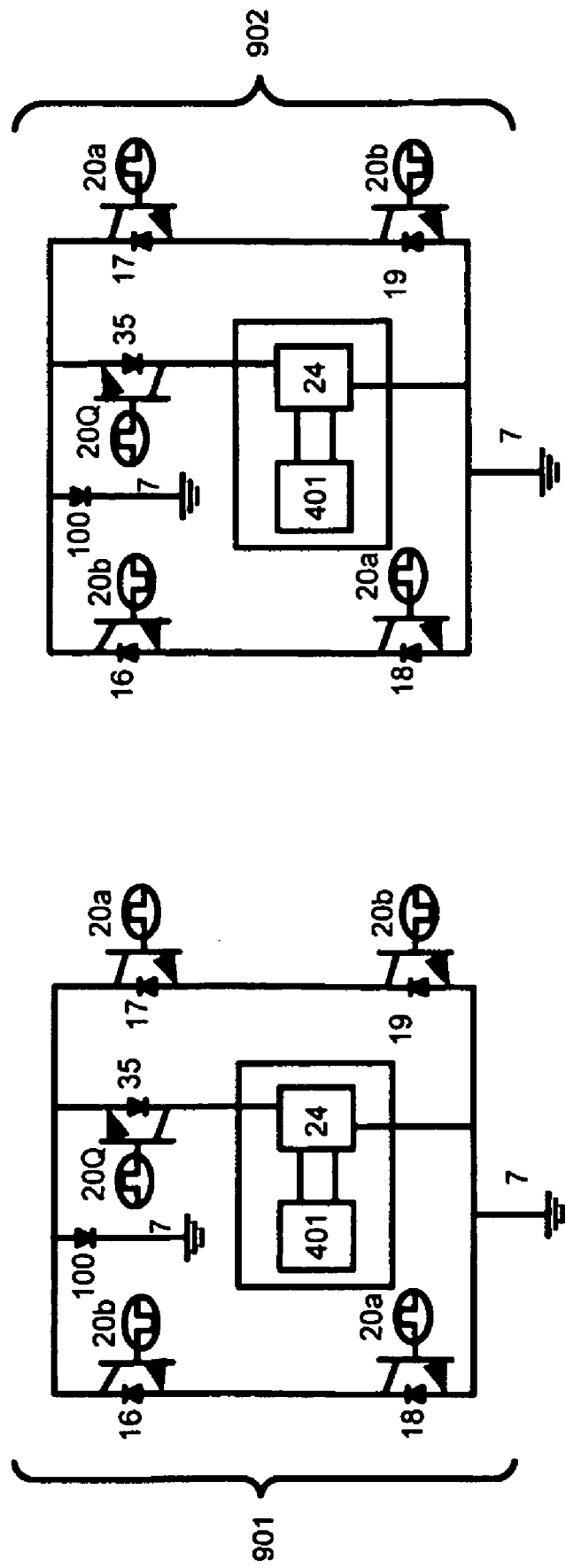
FIG. 9B illustrates circuitry for a reversible Tesla coil system where the function of emitter and receiver may alternate according to one aspect of the system and method of the present disclosure

As shown in FIGS. 9A and 9B, according to one aspect of the present disclosure, Tesla resonators 1501 and 1502 may couple energy to each other and may be "reversible," i.e., each Tesla resonator 1501 and 1502 may emit and receive energy so either one may be used. In FIG. 9A, resonators 1501 and 1502 are each coupled to driving circuits 901 and 902 so each may act as an emitter and/or a receiver. In one aspect, if IGBT 35 of circuit 901 is set to closed by logic signal 20Q, then circuit 901 would function as downstream circuitry of receiver 102 and, therefore, would ultimately produce DC current at DC out 36 (as shown in FIG. 6). In one aspect, if IGBT 35 of circuit 901 is set to open by logic signal 20Q, then circuit 901 would function as emitter 101.

As shown in FIG. 10, in one aspect, the system of the present disclosure may include receivers 1003R, 1005R and 1006R and emitters 1001E, 1002E, and 1004E may be arranged to relay energy. In one aspect, two emitters 1001 and 1002 transmit energy wirelessly to a receiver 1003R that is connected through, for example, wires 1008 and 1009 to a third emitter 1004E. Emitter 1004E may then wirelessly power three separate receivers 1005R, 1006R, and 1007R. It should be noted that this illustration is provided as an example of a repeater winding network and not as a limiting design.

Figure 11:
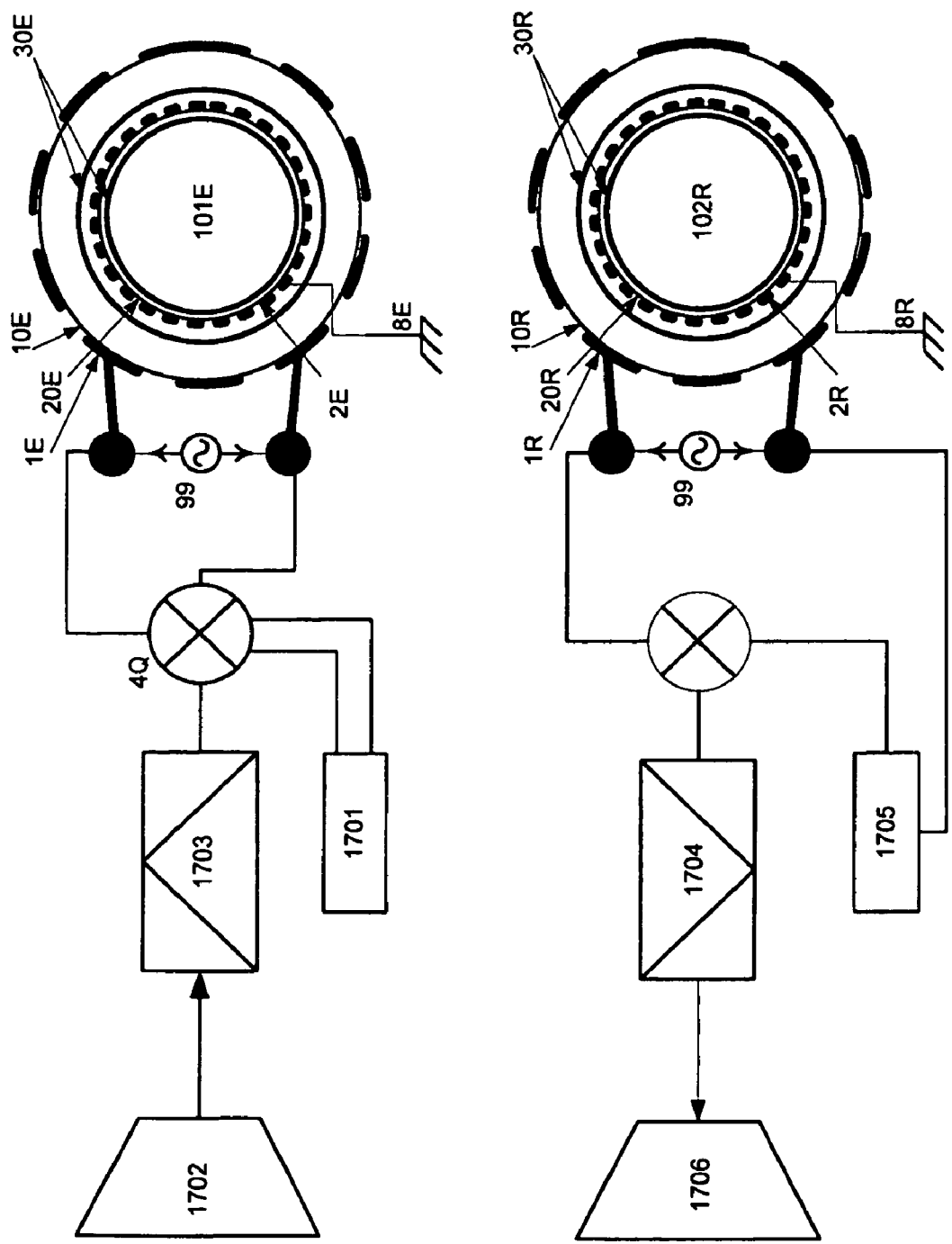
FIG. 11 illustrates a representative method of information and power transmission using a Tesla coil system according to one aspect of the system and method of the present disclosure.

As shown in FIG. 11, another aspect of the system of the present disclosure may include the use of imposing a modulation upon the basic carrier wave emitted from emitter 101. Any number of digital or analog modulation methods or schemes may be applied to a basic carrier wave. After reception by receiver 102, the carrier wave may be demodulated to provide information transfer while using the same carrier wave for power transfer. This simultaneous transfer of information and power may be effectuated by using the same devices discussed in aspects of the present invention, e.g., emitter 101 and receiver 102.

For example, in one aspect, the system may transmit energy along with an audio signal. The audio signal may be modulated, such as with pulse width modulation (PWM) or amplitude modulation (AM) onto, for example, an 80 kHz power carrier signal from emitter 101E to receiver 102R embodied within a speaker assembly. One of ordinary skill in the art would understand that alternative modulation schemes, such as, frequency modulation (FM) or phase modulation, may be used with the system as described in aspects of the present disclosure.

In one aspect, signal input 1702 is modulated using modulator 1703 and combined with power input 1701 through the driving circuit 4Q (as shown according in FIG. 2 according to one aspect of the present invention). In this aspect, the high-frequency side of the input signal becomes a mixer, imposing the data signal on AC input 99, which is the carrier wave frequency, generated by driving circuit 4Q. The speaker assembly with emitter 101E may be placed anywhere within a range of receiver 102R and be self-powered by reception of power from emitter 101E to drive electronics to demodulate the carrier signal to reproduce the audio signal.

In further aspects, demodulator 1704 may be placed to sense combined signal 99 reproduced at the output of the receiver 102R. The signal may be sensed by direct connection or by other means familiar to one of ordinary skill in the art. Data signal 1706 is then produced by demodulator 1704. The carrier component of signal 99 is fed into circuitry 1705, which may include diode array 24 (as shown in FIG. 4 according to one aspect), capacitor bank 401 (as shown in FIG. 4 according to one aspect), and circuitry 603 (as shown in FIG. 6 according to one aspect) as necessary to produce power.

In one aspect, circuitry for performing driving circuitry 4Q and modulator 1703 are described in U.S. non-provisional patent application Ser. No. 12/152,525 titled "System and Method for Controlling an Electromagnetic Field Generator," filed May 15, 2008.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A system for wirelessly transmitting and receiving energy, comprising:
   an emitter, comprising:
      a primary emitting winding wrapped around a first support; and
      a secondary emitting winding wrapped around a second support; and
   a receiver, comprising:
      a primary receiving winding wrapped around a third support; and
      a secondary receiving winding wrapped around a fourth support;
   wherein the second support is located within the first support and the fourth support is located within the third support.

2. A system for wirelessly transmitting and receiving energy, comprising:
   an emitter, comprising:
      a primary emitting winding wrapped around a first support; and
      a secondary emitting winding wrapped around a second support; and
   a receiver, comprising:
      a primary receiving winding wrapped around a third support; and
      a secondary receiving winding wrapped around a fourth support;
   wherein the secondary emitting winding is coupled to a first top load, and wherein the secondary receiving winding is coupled to a second top load.

3. A system for wirelessly transmitting and receiving energy, comprising:
   an emitter, comprising:
      a primary emitting winding wrapped around a first support;
      a secondary emitting winding wrapped around a second support; and
      a tertiary emitting winding wrapped around a fifth support; and
   a receiver, comprising:
      a primary receiving winding wrapped around a third support;
      a secondary receiving winding wrapped around a fourth support; and
      a tertiary receiving winding wrapped around a sixth support;
   wherein:
      the tertiary emitting winding is coupled to the secondary emitting winding and to a first top load; and
      the tertiary receiving winding is coupled to the secondary receiving winding and to a second top load.

4. A system for wirelessly transmitting and receiving energy, comprising:
   an emitter, comprising:
      a primary emitting winding wrapped around a first support;
      a secondary emitting winding wrapped around a second support; and
      a tertiary emitting winding wrapped around a fifth support; and
   a receiver, comprising:
      a primary receiving winding wrapped around a third support;
      a secondary receiving winding wrapped around a fourth support; and
      a tertiary receiving winding wrapped around a sixth support;
   wherein the first support is located within the second support, the third support is located within the fourth support, the fifth support is located above the first and second supports, and the sixth support is located above the third and fourth supports.

5. A system for wirelessly transmitting and receiving energy, comprising:
   an emitter, comprising:
      a primary emitting winding wrapped around a first support; and
      a secondary emitting winding wrapped around a second support; and
   a receiver, comprising:
      a primary receiving winding wrapped around a third support; and
      a secondary receiving winding wrapped around a fourth support;
   wherein:
      the primary emitting winding is coupled to a first driver, wherein the first driver is coupled to a first rectifying circuit, wherein the first rectifying circuit is coupled to a first one or more capacitors; and the primary receiving winding is coupled to a second driver, wherein the second driver is coupled to a second rectifying circuit, wherein the second rectifying circuit is coupled to a second one or more capacitors.

6. The system of claim 5, wherein the emitter is a reversible emitter and further comprises a tertiary emitting winding wrapped around a fifth support coupled to the secondary emitting winding and to a first top load; and the receiver is a reversible receiver and further comprises a tertiary receiving winding wrapped around a sixth support coupled to the secondary receiving winding and to a second top load.

7. The system of claim 6, wherein:

the first driver comprises insulated gate bipolar transistors in an H-bridge configuration; and the second driver comprises insulated gate bipolar transistors in an H-bridge configuration.

8. A method of wirelessly transferring data and energy, comprising:

generating a carrier wave at a resonant frequency of an emitter;

modulating the carrier wave to create a combined signal;

driving the combined signal to an AC input of the emitter;

electromagnetically coupling the emitter to a receiver; and reproducing the combined signal in an AC output of the receiver.

9. A method of wirelessly transferring data and energy, comprising:

generating a carrier wave;

modulating the carrier wave to create a combined signal;

driving the combined signal to an AC input of an emitter;

electromagnetically coupling the emitter to a receiver; and reproducing the combined signal in an AC output of the receiver;

wherein:

the emitter comprises:

a primary emitting winding wrapped around a first support and coupled to a driver; and a secondary emitting winding wrapped around a second support and coupled to a first top load;

the receiver comprises:

a primary receiving winding wrapped around a third support and coupled to a rectifying circuit, wherein the rectifying circuit is coupled to one or more capacitors; and a secondary receiving winding wrapped around a fourth support and coupled to a second top load.

10. A method of wirelessly transferring data and energy, comprising:

generating a carrier wave;

modulating the carrier wave to create a combined signal;

driving the combined signal to an AC in ut of an emitter;

electromagnetically coupling the emitter to a receiver; and reproducing the combined signal in an AC output of the receiver;

wherein:

the emitter comprises:

a primary emitting winding wrapped around a first support and coupled to a driver;

a secondary emitting winding wrapped around a second support; and a tertiary emitting winding wrapped around a third support coupled to the secondary emitting winding and to a first top load;

the receiver comprises:

a primary receiving winding wrapped around a fourth support and coupled to a rectifying circuit, wherein the rectifying circuit is coupled to one or more capacitors;

a secondary receiving winding wrapped around a fifth support; and a tertiary receiving winding wrapped around a sixth support coupled to the secondary receiving winding and to a second top load.

11. A method for wirelessly transmitting and receiving energy, comprising:

(a) transmitting an alternating current into a driver coupled to a primary emitting winding of an emitter;

(b) inducing the alternating current into a secondary emitting winding of the emitter;

(c) sensing a frequency of the alternating current on the secondary emitting winding;

(d) transmitting a feedback signal to the driver;

(e) driving the alternating current into the primary emitting winding;

(f) electromagnetically coupling the emitter to a receiver;

(g) inducing the alternating current into a secondary receiving winding of the receiver; and (h) inducing the alternating current into a primary receiving winding of the receiver.

12. The method of claim 11, wherein the feedback signal is based on the frequency of the alternating current.

13. The method of claim 11, wherein the driving of the alternating current into the primary emitting winding is at a resonant frequency of the secondary emitting winding.

14. The method of claim 11, further comprising:

(i) outputting the alternating current into a rectifying circuit;

(j) rectifying the alternating current into a direct current; and (k) reducing one or more ripples on the direct current.

* * * * *